G. C. BELL.
Educational and Advertising Cards.
No. 202,692  Patented April 23, 1878.
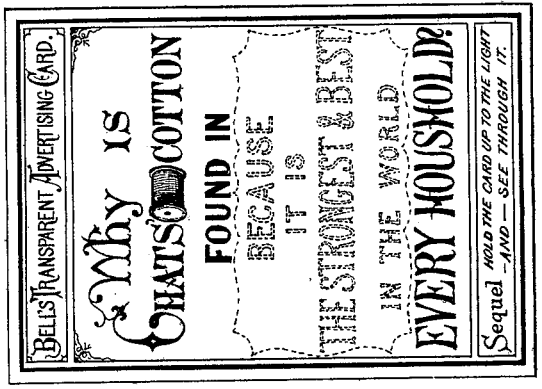
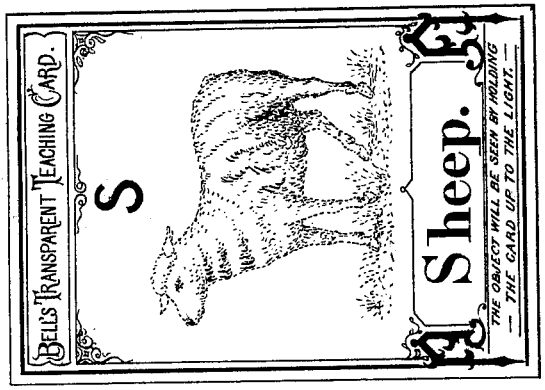
Witnesses:
Inventor:
George C. Bell.

UNITED STATES PATENT OFFICE.

GEORGE C. BELL, OF BROOKLYN, NEW YORK, ASSIGNOR TO WILLIS VAN TINE, OF NEW YORK CITY.

IMPROVEMENT IN EDUCATIONAL AND ADVERTISING CARDS.

Specification forming part of Letters Patent No. 202,692, dated April 23, 1878; application filed August 16, 1877.

*To all whom it may concern:*

Be it known that I, GEORGE C. BELL, of the city of Brooklyn, in the county of Kings and State of New York, have invented certain new and useful Improvements in Transparent Cards for Teaching, Advertising, and other Purposes; and I do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1 shows the invention as applied to a teaching-card; and Fig. 2, the same as it is made when used for the purpose of advertising, the principle of the invention being illustrated in each.

The invention consists of a transparent card containing a portion printed, painted, stamped, or lithographed upon the face-surface, so as to be read or seen by reflected light, and an explanatory or responsive portion printed, painted, stamped, or lithographed, and placed beneath the face-surface, so as to be seen or read from the face-surface only by transmitted light—that is, by light passing through the transparent card. This latter portion may be placed between the several sheets of paper which make up the card, or may be placed upon the back or reverse side of the card, so as to be properly read or seen looking at the face of the card with the light coming from the rear and through the card.

The making of transparent cards and papers, being well known in the arts, and forming no part of this invention, need not be particularly described.

The cards are to be of such size and thickness as the subject to be illustrated requires. For teaching, cards the size and thickness of the illustrated A B C cards are suitable, or it may be that of ordinary playing-cards. When they are to carry an advertisement in the form of question and answer, the same sizes will, in most cases, be sufficient; but this may be increased or diminished, as desired. Any other card involving either a sentence or picture and an explanation or a question and its answer, the first part to be read by reflected light and the latter by transmitted light, may be made in the same manner by this invention.

In Fig. 1 the invention is shown as applied to a card for teaching a child its primer. The letter S is placed at the top, and the word "sheep," of which S is the initial letter, at the bottom, of the card. By holding the card up toward the light the picture of a sheep will be seen by transmitted light.

Fig. 2 shows in like manner the invention as applied in securing and fixing the attention upon an advertisement.

In both instances the surprise produced in having the explanation of what is seen by reading the face of the card by holding it up toward the light and reading through the face-surface of the card by means of transmitted light constitutes the essential merit of the invention, and the combining of these two expressive parts of the intelligence to be conveyed by uniting them in a single card, so that the one explains or responds to the other, constitutes the essential principle of the invention.

It is obvious that, instead of having the word on the face of the card, and beneath the face the responsive picture, the arrangement may be transposed, so that the picture will be seen by the reflected light, and the word explanatory thereof seen by the transmitted light.

In order to secure the proper reading of the cards, marginal directions are or may be printed upon the face or back of each card, as shown in the illustrations given, in both of which the central portions in dotted lines are those which are to be seen or read from the face side only by transmitted light.

I do not claim, broadly, a transparent card, nor a transparent card or paper having pictures, printed matter, or water-lines placed inside or back of the face, so as to be read by transmitted light, as such have been made; but,

Having thus described my invention, what I claim, and desire to secure by Letters Patent of the United States, is—

A card for imparting instruction or information, made of paper or other translucent material, having imprinted or otherwise placed upon its face a word, or word and picture, to be viewed by reflected light, and beneath its face a word or picture responsive to or explanatory of the inquiry on the face, to be viewed by transmitted light, substantially as described, and for the purpose set forth.

In testimony that I claim the foregoing as my own I affix my signature in presence of two witnesses.

GEORGE C. BELL.

Witnesses:
 ROBERT FELMER,
 J. L. THOMPSON.